US007551896B2

(12) United States Patent
Haller et al.

(10) Patent No.: US 7,551,896 B2
(45) Date of Patent: *Jun. 23, 2009

(54) METHOD, SYSTEM AND COMPUTER READABLE MEDIUM FOR PROVIDING AN OUTPUT SIGNAL HAVING A THEME TO A DEVICE IN A SHORT DISTANCE WIRELESS NETWORK

(75) Inventors: Amit Haller, Belmont, CA (US); Ziv Haparnas, Tel Aviv (IL)

(73) Assignee: IXI Mobile (R&D), Ltd (IL)

( * ) Notice: Subject to any disclaimer, the term of this patent is extended or adjusted under 35 U.S.C. 154(b) by 646 days.

This patent is subject to a terminal disclaimer.

(21) Appl. No.: 11/123,855

(22) Filed: May 5, 2005

(65) Prior Publication Data

US 2006/0014493 A1 Jan. 19, 2006

Related U.S. Application Data

(63) Continuation of application No. 10/224,749, filed on Aug. 20, 2002, now Pat. No. 6,909,878.

(51) Int. Cl.
*H04B 7/00* (2006.01)
*H04Q 7/20* (2006.01)
(52) U.S. Cl. ................. 455/41.3; 455/426.1; 455/552.1
(58) Field of Classification Search ........... 455/11.1, 455/41.2, 41.3, 412.1, 418, 419, 420, 426.1, 455/426.2, 552.1, 553.1, 566, 567; 370/338
See application file for complete search history.

(56) References Cited

U.S. PATENT DOCUMENTS

2003/0194090 A1 10/2003 Tachikawa
2006/0046664 A1 3/2006 Paradiso et al.

*Primary Examiner*—Lee Nguyen
(74) *Attorney, Agent, or Firm*—Century IP Group, Inc.; F. Jason Far-hadian, Esq.

(57) ABSTRACT

A method, system, and computer readable medium allows a user to select an output signal for device/terminal in short distance wireless network. In embodiments of the present invention, the output signal is a ring tone, alarm, background image, vibration signal, font type, or portion of a motion picture. In embodiments of the present invention, a system comprises a first and second device, in a short distance wireless network, generating a first and second output signal. A cellular device generates a first and a second short-range radio signals responsive to a cellular signal from a cellular network. The cellular signal includes a first multimedia file for the first device and a second multimedia file for the second device. In an embodiment of the present invention, the first multimedia file and second multimedia file are thematically related. In an embodiment of the present invention, a processing device is coupled to the cellular network and stores the first and second multimedia files. In an embodiment of the present invention, a user selects a theme on a device or at a web site in order to change the output signals in the short distance wireless network. In an embodiment of the present invention, the output signals are changed periodically without user intervention. In still a further embodiment of the present invention, promoters or users pay a telecommunication network provider for conveniently and safely changing the output signals.

19 Claims, 7 Drawing Sheets

METHOD, SYSTEM AND COMPUTER READABLE MEDIUM FOR PROVIDING AN OUTPUT SIGNAL HAVING A THEME TO A DEVICE IN A SHORT DISTANCE WIRELESS NETWORK

This application is a continuation of U.S. patent application Ser. No. 10/224,749 filed on Aug. 20, 2002 now U.S. Pat. No. 6,909,878.

FIELD OF THE INVENTION

This invention relates generally to a network, and in particular, for providing an output signal for a device in a network.

BACKGROUND OF THE INVENTION

A wireless communication device, such as a cellular telephone, is typically a node of a WAN or communication network. The cellular telephone may also be a part of a short distance wireless network for communicating with other user devices, such as a laptop, watch, messaging terminal, Personal Digital Assistant ("PDA") and/or headset. For example, Bluetooth™ technology (www.Bluetooth.com) provides wireless communications between devices in a short distance wireless network.

A user of a short distance wireless network has numerous devices or terminals that may have output signals for indicating events. For example, a cellular telephone has a ring tone for indicating an incoming telephone call. A messaging terminal may likewise output a signal that indicates an email has arrived. A watch may output an alarm indicating a scheduled meeting. A laptop computer may output a background image and may have a video for a screensaver.

When a device is purchased, a manufacturer or distributor typically selects these output signals. However, a user may be able to select a preferred output signal. For example, a user may alter a background on a laptop computer indicating the name of the laptop computer manufacturer to a preferred forest scene. Likewise, a user may select a desired ring tone from a predetermined set of ring tones stored on the cellular telephone.

However, there are a number of disadvantages in a user programming a desired output signal. First, a user often has to read and study manuals accompanying a recently purchased device in order to alter an output signal. Moreover, if a user grows tired of a particular output signal, the user may have to once again find the user manual and spend time following instructions in altering the output signal.

Second, some devices may have a limited number of output signal options. For example, a cellular telephone may have only a few different types of ring tones and a user may be interested in programming a distinctive current tone that is not available from the stored ring tones on the cellular device.

Third, a user may be interested in having all or some of the output signals of various devices related.

Fourth, if a user attempts to alter an output signal by downloading files from the Internet, the user has to spend time determining whether a targeted file is compatible with the user's device. For example, if a user wants to download a screensaver from the Internet, the user first must determine whether the screensaver is compatible with the user's lap top computer. Also, the user must make sure the files are safe when downloading files from an unfamiliar web site. A computer virus may be embedded in the downloaded screensaver that then may damage the laptop computer or information stored on the laptop computer.

Telecommunication operators would also like to provide a greater variety of output signals for users to select and generate additional revenue. Telecommunication operators may be able to generate revenue by selling the various output signals to users. Further, telecommunication operators may be able to generate revenue from promoters that want to promote a promotional event. For example, a motion picture studio may pay a telecommunication operator a certain fee for every background image, depicting a scene in a promoted motion picture, provided to a user's laptop computer. The motion picture scene background is seen by friends and associates of the user and is used to advertise the movie and promote motion picture ticket sales. Likewise, a music tour promoter may pay a telecommunication operator a certain fee for every ring tone, indicating a music artist's work, provided to a cellular telephone. Thus, the music artist's ring tone, played in public, is used to promote record and concert ticket sales.

Therefore, it is desirable to provide a method, a system, and a computer readable medium that allows a user to conveniently and safely select an output signal for a device from a large selection of output signals. It is further desirable that the user can select output signals that are related and may be changed without user intervention. A telecommunication network operator may be able to generate revenue by providing desired output signals to devices while providing added value and convenience to users.

SUMMARY OF THE INVENTION

A method, system, and computer readable medium allows a user to select an output signal for a device in short distance wireless network. In embodiments of the present invention, the output signal is a ring tone, alarm, background image, vibration signal, font type, or portion of a motion picture. In embodiments of the present invention, a system comprises a first and second device, in a short distance wireless network, generating a first and second output signal. A cellular device generates a first and a second short-range radio signals responsive to a cellular signal from a cellular network. The cellular signal includes a first multimedia file for the first device and a second multimedia file for the second device. In an embodiment of the present invention, the first multimedia file and second multimedia file are thematically related. In an embodiment of the present invention, a processing device is coupled to the cellular network and stores the first and second multimedia files. In an embodiment of the present invention, a user selects a theme on a device or at a web site in order to change the output signals in the short distance wireless network. In an embodiment of the present invention, the output signals are changed periodically without user intervention. In still a further embodiment of the present invention, promoters or users pay a telecommunication network provider for conveniently and safely changing the output signals.

According to another embodiment of the present invention, a system, comprises a first device, in a short distance wireless network, generating a first output signal responsive to a first short-range radio signal. A cellular device generates the short-range radio signal responsive to a cellular signal. The cellular signal includes a first multimedia file having a theme.

According to another embodiment of the present invention, the first short-range radio signal includes the first multimedia file.

According to another embodiment of the present invention, the first short-range radio signal includes a signal generated by the cellular device executing the first multimedia file.

According to an embodiment of the present invention, the first device includes a short-range radio processor and a 2.4 or 5.7 GHZ transceiver.

According to still a further embodiment of the present invention, the cellular device uses a protocol selected from the group consisting of a Global System for Mobile Communications ("GSM"), a Code Division Multiple Access ("CDMA"), a CDMA 2000 protocol, a Time Division Multiple Access ("TDMA"), General Packet Radio Services ("GPRS") and an equivalent thereof.

According to an embodiment of the present invention, the device is selected from a group consisting of a desktop computer, a laptop computer, a personal digital assistant, a headset, a messaging terminal, a pager, a printer, a thin terminal, a watch, a digital camera or an equivalent.

According to an embodiment of the present invention, the short distance wireless network is a Bluetooth™ network.

According to an embodiment of the present invention, the first multimedia file is a file selected from the group consisting of audio, image and video.

According to an embodiment of the present invention, the first multimedia file is periodically transferred from the processing device to the first device.

According to an embodiment of the present invention, the first multimedia file is transferred from the processing device to the first device in response to a user selection.

According to an embodiment of the present invention, the first multimedia file is transferred from the processing device to the first device in response to an event.

According to an embodiment of the present invention, the user selection includes a user selecting the first multimedia file at a web site.

According to an embodiment of the present invention, a user selects the first multimedia file stored on the cellular device.

According to an embodiment of the present invention, a user selects the first multimedia file stored on the first device.

According to an embodiment of the present invention, a method comprises the steps of selecting a theme for a short-range radio network having a plurality of devices and, providing a plurality of files to the plurality of devices.

According to another embodiment of the present invention, the selecting step includes the step of a user selecting a theme at a website.

According to an embodiment of the present invention, the selecting step includes the step of a user selecting a theme from a menu having a plurality of themes stored on a first device in the plurality of devices.

According to an embodiment of the present invention, the plurality of files include a first multimedia file for a first device in the plurality of devices, a second multimedia file for a second device in the plurality of devices and a third multimedia file for a third device in the plurality of devices.

According to an embodiment of the present invention, the providing step includes the steps of obtaining the types of devices in the plurality of devices, by a processing device, and transferring the plurality of respective files to the plurality of respective devices by the processing device and a cellular device in the plurality of devices.

According to an embodiment of the present invention, the providing step includes the steps of obtaining the types of devices in the plurality of devices, by a user, and transferring the plurality of respective files to the plurality of respective devices by the processing device.

According to an embodiment of the present invention, the providing step includes the step of selecting a first file in the plurality of files stored on a first device in the plurality of devices. The first device generates an output signal responsive to the first file.

According to an embodiment of the present invention, the providing step includes the steps of selecting a first file in the plurality of files stored on a cellular device in the plurality of devices. The cellular device transfers a first signal to a first device in the plurality of devices in order to generate an output signal by the first device.

According to an embodiment of present invention, an article of manufacture, including a computer readable medium is provided. The article comprises a short-range radio software component to generate a short-range radio signal to generate an output signal from a device in the short distance wireless network, responsive to a theme message. A cellular software component receives a cellular signal, containing the theme message, from a cellular network.

Other aspects and advantages of the present invention can be seen upon review of the figures, the detailed description, and the claims that follow.

DETAILED DESCRIPTION

I. System Overview

Figure 1:
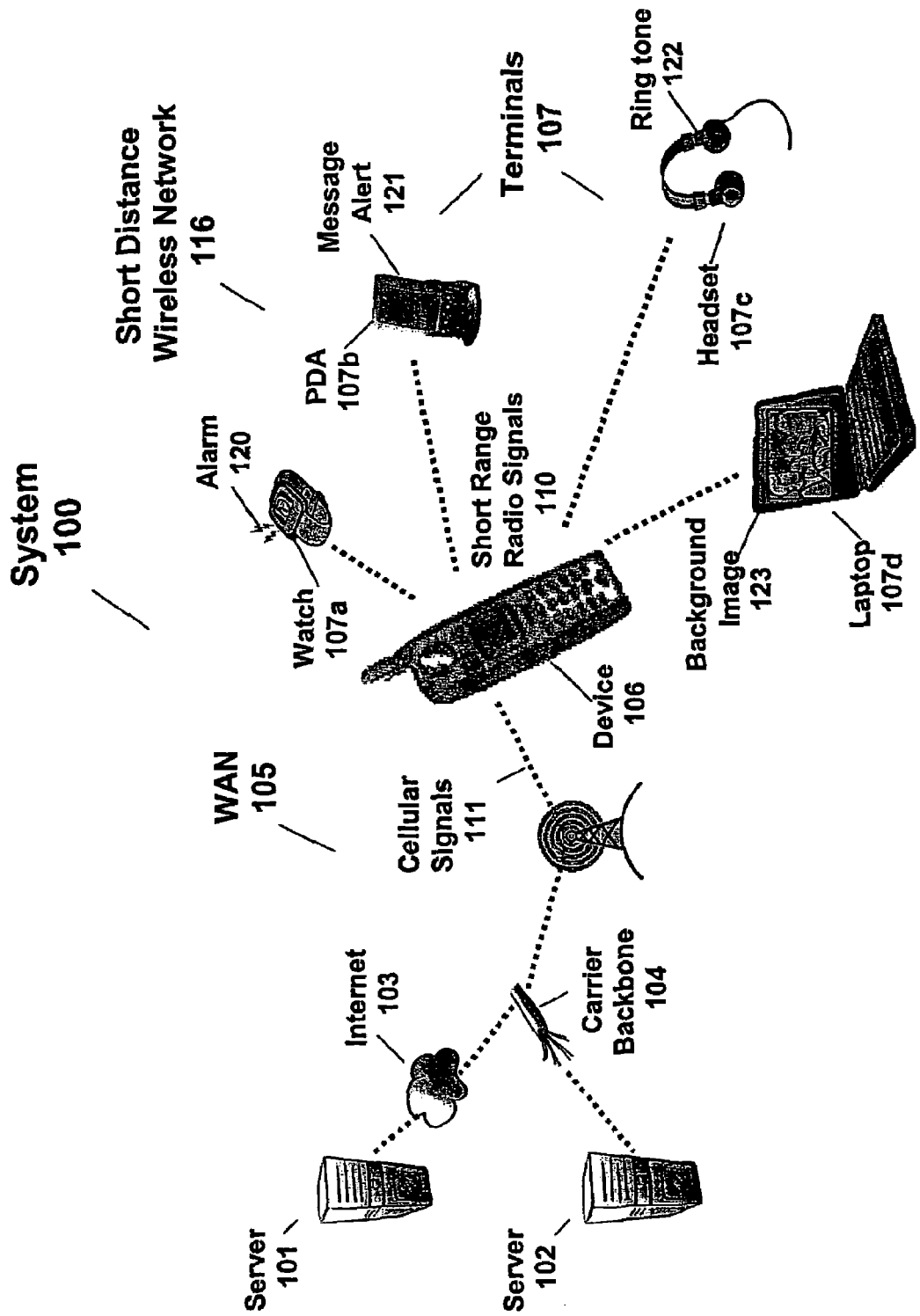
FIG. 1 illustrates a system according to an embodiment of the present invention.

The following description and claims relate to a method, a system, and a computer readable medium for providing output signals to respective devices and/or terminals in a short distance wireless network 116, as illustrated by FIG. 1, according to an embodiment of the present invention.

In an embodiment of the present invention, a multimedia file for a particular device and/or terminal is provided to short distance wireless network 116 in order to provide a particular output signal. An application software component will then use the multimedia file to generate an output signal from a particular device and/or terminal. An output signal from a device 106 or terminals 107 may include an audio signal, video signal, image signal, and/or vibration signal. In particular, an output signal may be an alarm, message alert, ring tone, background image, vibration, screen saver, set of fonts in a GUI, or an equivalent, singly or in combination. An audio signal may include at least a portion of a sound track of a motion picture, at least a portion of a musical work, or at least a portion of an audio/visual work.

Output signals for short distance wireless network 116 have a theme or are thematically related in an embodiment of the present invention. A theme is defined as having a specific and distinctive quality, characteristic, or concern. For example, a user may be interested in a "Mission Impossible" theme or a theme related to the Mission Impossible television series and/or motion picture. Thus, multimedia files for generating output signals having a Mission Impossible theme are downloaded to short distance wireless network 116. For example, a multimedia file for generating background image 123 including an image of a Mission Impossible movie scene is downloaded. A multimedia file for generating a ring tone 122 including a portion of the Mission Impossible soundtrack is likewise downloaded. And, a multimedia file to generate an alarm 120 including a voice of a Mission Impossible character is also downloaded.

As one of ordinary skill in the art would appreciate, a user may desire a variety of different types of themes, such as: an entertainer theme, a musician theme, a sports person theme, a sports team theme, a sporting event theme, a motion picture theme, a television show theme, an advertisement theme, a play theme, a music type theme, a nature theme, an animal theme, a character theme, a cartoon theme, an artist theme, a historical period theme or an equivalent theme.

As described below, a user can select a theme for a plurality of output signals generated in short distance wireless network 116 or select a particular output signal for a particular device and/or terminal. In an alternate embodiment of the present invention, a plurality of output signals having a theme or a particular output signal for a particular device and/or terminal is provided to short distance wireless network 116 in response to a promotional event, such as a public release of a motion picture or a start of musical tour. In still a further embodiment of the present invention, a plurality of output signals having a theme or a particular output signal for a particular device and/or terminal is provided to short distance wireless network 116 periodically.

In an embodiment of the present invention, a short distance wireless network 116 is a network of processing devices, such as a personal computer or headset, that span a relatively small physical area, wherein at least one device generates and receives a short-range radio signal for communicating with another device in the network. In an embodiment of the present invention, a short-range radio signal can travel between approximately 0 and approximately 1000 feet. An example of a short distance wireless network includes a network of devices formed by Bluetooth™, HomeRF, 802.11 technologies, or an equivalent, singly or in combination. In an embodiment of the present invention, each processing device in a short distance wireless network has its own processing unit that executes a software component stored on the processing device memory, but also may access data and devices on the short distance wireless network. In an embodiment of the present invention, a wire, and in particular an Ethernet, provides communication between two or more processing devices in a short distance wireless network. In an alternate embodiment, electromagnetic signals provide wireless communication between one or more processing devices in a short distance wireless network. In still another embodiment, both wires and electromagnetic signals provide communication between processing devices in a short distance wireless network.

In an embodiment of the present invention, a WAN includes multiple LANs and/or short distance wireless networks connected over a relatively large distance. Telephone lines and electromagnetic signals, singly or in combination, couple the LANs and/or short distance wireless networks in a WAN. In an embodiment of the present invention, WAN 105 includes a cellular network generating and receiving cellular signals 111. In an embodiment of the present invention, a cellular network is defined as a communications system dividing a geographic region into sections, called cells. In an analog embodiment of the present invention, the purpose of this division is to make the most use out of a limited number of transmission frequencies. In an analog embodiment of the present invention, each connection, or for example conversation, requires its own dedicated frequency, and the total number of available frequencies is about 1,000. To support more than 1,000 simultaneous conversations, cellular systems allocate a set number of frequencies for each cell. Two cells can use the same frequency for different conversations so long as the cells are not adjacent to each other.

Figure 3A:
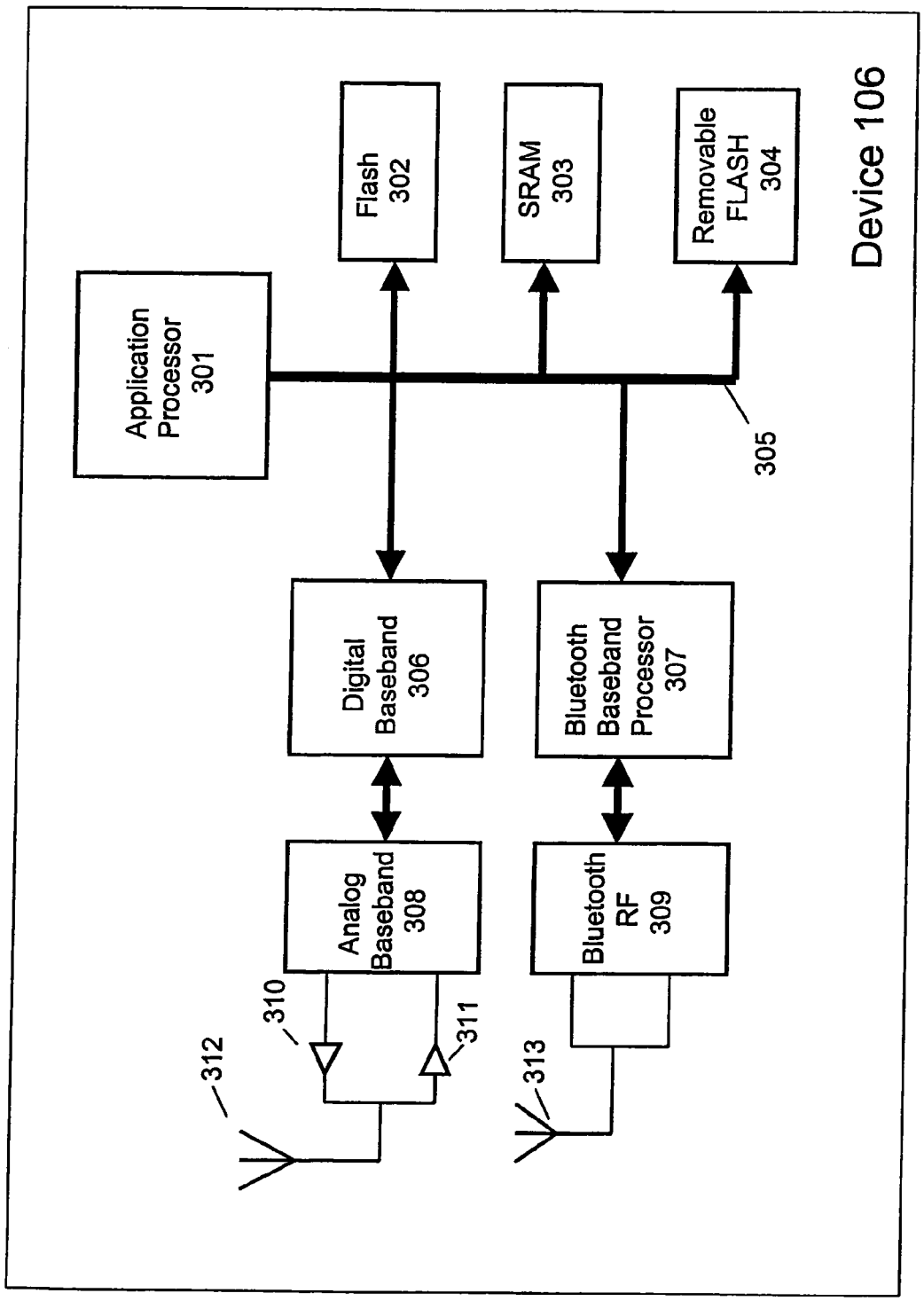
FIGS. 3a-b are hardware block diagrams of devices according to an embodiment of the present invention.
Figure 3B:
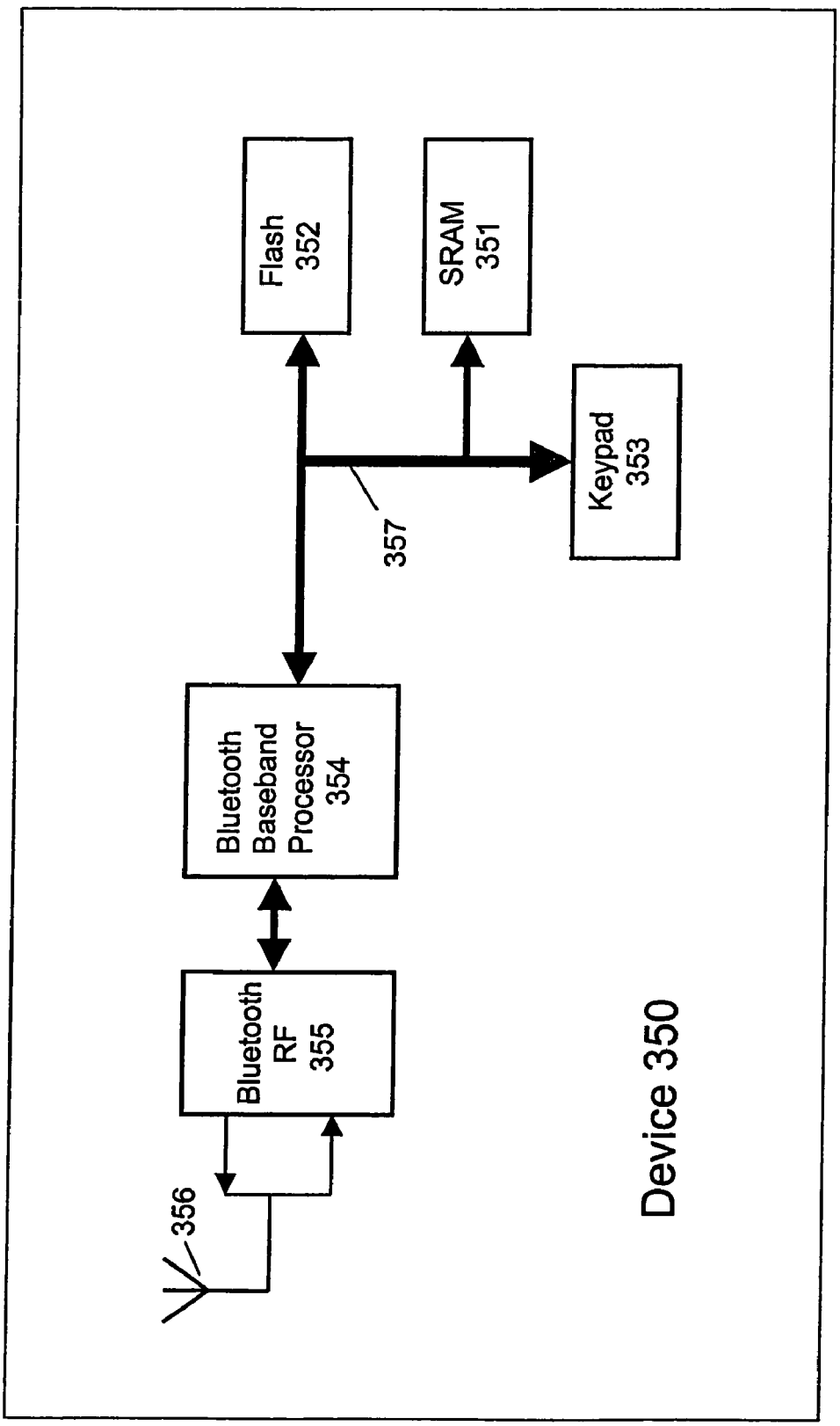

FIG. 1 illustrates system 100 according to an embodiment of the present invention. System 100 includes other devices, or terminals 107, coupled to wireless device 106. In an embodiment of the present invention, device 106 and one or more terminals 107 communicate to form a short distance wireless network 116. In an embodiment of the present invention, terminals 107 are coupled to device 106 by short-range radio signals 110 to form short distance wireless network 116. In an embodiment of the present invention, some or all of terminals 107 may have wired connections. In an embodiment of the present invention, terminals 107 include watch 107a, PDA 107b, headset 107c and laptop computer 107d that generate respective output signals. In an embodiment of the present invention, watch 107a generates an alarm 120; PDA 107b generates a message alert 121; headset 107c generates a ring tone 122; and laptop 107d generates a background image 123. In an alternate embodiment, fewer or more terminals that generate similar or different respective output signals are used in short distance wireless network 116. In an alternate embodiment, terminals 107 include a desktop computer, a pager, a printer, a thin terminal, a messaging terminal, a digital camera or an equivalent. In an embodiment of the present invention, terminals 107 include a Bluetooth™ 2.4 GHz transceiver. Likewise, device 106 includes a Bluetooth™ 2.4 GHZ transceiver. In an alternate embodiment of the present invention, a Bluetooth™ 5.7 GHz transceiver is used. Hardware for device 106 and terminals 107 is illustrated in FIGS. 3a-b in an embodiment of the present invention.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network transmitting and receiving cellular signals 111. In an embodiment of the present invention, cellular signals 111 are transmitted using a protocol, such as a Global System for Mobile communications ("GSM") protocol. In alternate embodiments, a Code Division Multiple Access ("CDMA"), CDMA 2000, Universal Mobile Telecommunications System ("UMTS"), Time Division Multiple Access ("TDMA"), General Packet Radio Service ("GPRS") protocol or an equivalent is used.

In an embodiment of the present invention, WAN 105 includes carrier backbone 104, servers 101-102 and Internet 103. In an embodiment of the present invention, IP packets are transferred between the components illustrated in FIG. 1. In alternate embodiments of the present invention, other packet types are transferred between the components illustrated in FIG. 1.

In an embodiment of the present invention, a WAN 105 includes an IP public or private network, such as a corporate secured network using a Virtual Private Network ("VPN").

In an alternate embodiment of the present invention, device 106 is coupled to a WAN 105 by an Ethernet, Digital Subscriber Line ("DSL"), or cable modem connection, singly or in combination.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 provide output signals, by way of downloading respective multimedia files, to device 106 and/or terminals 107. In an embodiment of the present invention, the multimedia files are stored in device 106 and are used to generate output signals from terminals 107. In an alternate embodiment of the present invention, the respective multimedia files are stored on respective terminals and are then used to generate respective output signals.

Figure 6:
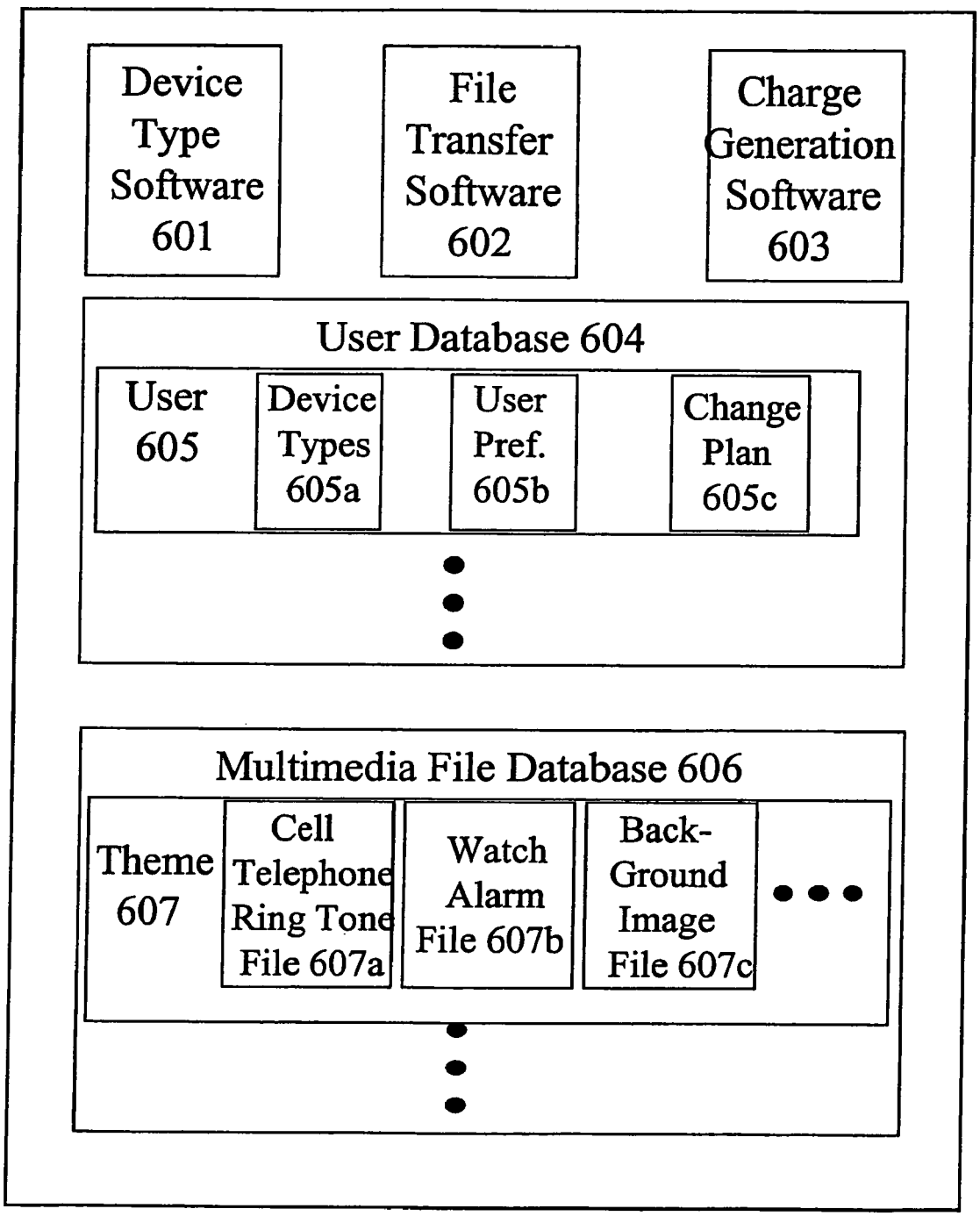
FIG. 6 illustrates a software block diagram architecture of server 101 according to an embodiment of the present invention

In an embodiment of the present invention, server 101 stores device/terminal type software component 601, file transfer software component 602, charge generation software component 603, user database 604 and multimedia file database 606, singly or in combination, as illustrated in FIG. 6.

In an embodiment of the present invention, server 101, and in particular device/terminal type software component 601, generates a message transferred over WAN 105 to device 106 to obtain device/terminal types in short distance wireless network 116. In an embodiment of the present invention, the message is an Internet/Protocol ("IP") message. In an embodiment of the present invention, the information from short distance wireless network 116 includes the type of devices/terminals, including device/terminal manufacturer, and the type of multimedia file used for generating an output from the device/terminal.

The message generated by device/terminal type software component 601 may be generated in response to a user selection of a theme or particular output signal, a promotional event or periodically. The results of this message or query is stored in user database 604, and in particular, associated with user record 605 in device types record 605a. User record 605 identifies the owner, operator or user of short distance wireless network 116 in user database 604. In an embodiment of the present invention, device/terminal type software component 601 queries device 106 periodically to determine the types of devices and terminals present. In alternate embodiments of the present invention, device 106 generates a message to device/terminal type software 601 indicating the types of devices/terminals in short distance wireless network 116. In still a further embodiment of the present invention, a user may enter the device/terminals types into a device 106, or a terminal, which then transfers the device/terminal types to device/terminal type software component 601 or a user may enter the device/terminal types of short distance wireless network 116 at a web site accessible by device/terminal type software component 601.

File transfer software component 602 is responsible for transferring the appropriate multimedia files in multimedia file data base 606 to a respective device or terminal in short distance wireless network 116 in an embodiment of the present invention. In an alternate embodiment of the present invention, file transfer software component 602 generates a message to device 106 that selects a stored plurality of multimedia files having a theme or a particular multimedia file to be used to output a selected plurality of output signals or signal in short distance wireless network 116.

Charge generation software component 603 generates a charge associated with providing selected output signals to short distance wireless network 116 in an embodiment of the present invention. An Invoice is printed out on a printer and mailed to user in an embodiment of the present invention using charge generation software component 603. In an alternate embodiment of the present invention, an invoice is e-mailed to user. In an alternate embodiment of the present invention, an invoice is mailed to a promoter of a promotional event. In an alternate embodiment, an invoice is mailed to an advertiser. Charge generation software component 603 accesses user database 604, and in particular charge plan 605c in generating invoice. In an embodiment of the present invention, charge generation software component 603 generates a charge based on the number, type and when a multimedia file is downloaded to short distance wireless network 116.

User database 604 includes information on respective users of short distance wireless networks in an embodiment of the present invention. For example, user database 604 includes a record for a user identified as user record 605 that includes device types field 605a, user preferences field 605b and charge plan field 605c, singly or in combination, in an embodiment of the present invention.

Device types field 605a stores the types of devices or terminals used in a short distance wireless network 116 owned, operated or used by user 600. Field 605a may include device type manufacturer, model and/or multimedia file type requirements for respective output signals in an embodiment of the present invention.

User preference field 605b includes preferences of user 600. A user can select and store a preference that output signals from devices or terminals in short distance wireless network 116 are periodically changed without any intervention from user 600. For example, a user can select and store a theme preference for a particular entertainer. A user may also select and store a preference as to how often the output signals are changed. For example, a multimedia file for providing a new background image 123 of the entertainer is downloaded to laptop 107d monthly and a multimedia file for a new ring tone playing a portion of the entertainer's latest hit song is likewise downloaded every two months to headset 107c. A user can also select and store a preference to have output signals changed in response to particular promotional event.

Charge plan 605c includes a charge plan for user 600. A charge plan 605c indicates how a user 605 will be charged based on the number, type and when an output signal is changed in an embodiment of the present invention. For example, user 600 may be charge $2.00 for the latest image of a sports figure and $1.00 for a ring tone using a portion of popular song.

Multimedia file database 606 stores a plurality of multimedia files for different types of devices and terminals in short distance wireless network 116 in an embodiment of the present invention. The plurality of files are stored according to a particular theme and device type in an embodiment of the present invention. For example, a theme 607 is Madonna, the entertainer, theme. Theme 607 includes a cellular telephone ring tone file 607a including an audio file of a portion of a currently played Madonna song for a Motorola cellular telephone. Watch alarm file 607b includes an audio file of Madonna's voice reminding a user of an appointment. Background image file 607c includes an image file of Madonna performing at a recent concert.

In an alternate embodiment, an advertiser pays a telecommunication operator a fee for downloading an advertisement theme or files for providing advertisements. For example, a "Coca Cola" ring tone and/or background is provided to short distance wireless network 116, and in particular, device 106 and laptop 107d, respectively. The Coca Cola Company then pays a telecommunication operator a fee for every downloaded file. In an alternate embodiment of the present invention, a telecommunication operator rebates the fee, or a portion of the fee, to a user of short distance wireless network 116.

In an embodiment of the present invention, the multimedia files are an audio file, image file, video file, vibration file, or an equivalent, singly or in combination. In particular, the multimedia files may include a variety of different types of files, such as: a GIF ("Graphics Interchange Format") file, a JPEG ("Joint Photographic Experts Group") file, a AVI file, a MPEG-1 ("Moving Picture Experts Group") file, a MPEG-2 file, a MPEG-3 file, a MPEG-4 file, a Video for Windows file, an Indeo file, a Quicktime file, a vibration file for generating a vibration signal, a font file such as a Windows FON file, a MP3 file, or an equivalent, singly or in combination.

Likewise as described above, the files are stored in formats for a variety of different types of devices and terminals. For example, an audio file for a Sony Ericsson cellular telephone ring tone may be stored as well as an audio file for a Motorola STARTAC cellular telephone.

Server 102, coupled to carrier backbone 104, has similar software components described above and bypasses Internet 103 in an alternate embodiment of the present invention.

II. Hand-held Device/Terminal Hardware

Figure 2:
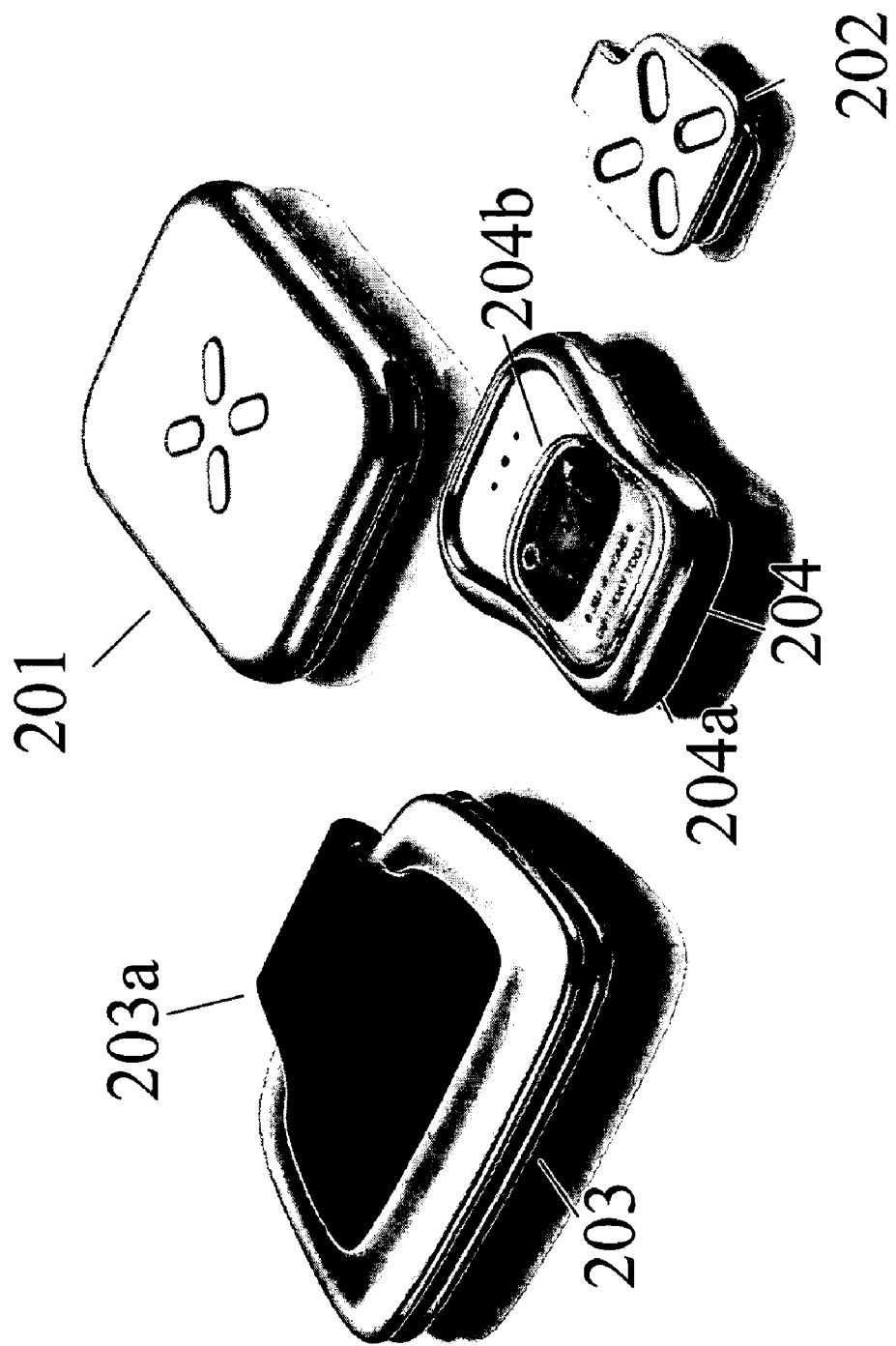
FIG. 2 illustrates thin terminals and a wireless device according to an embodiment of the present invention.

FIG. 2 illustrates embodiments of terminals 107 and device 106. In an embodiment of the present invention, there are two types of terminals: 1) smart terminals and 2) thin terminals. In an alternate embodiment of the present invention, smart terminals execute user logic and applications. Smart terminals have a relatively powerful processing unit, operating system and applications. Their main needs from a short distance wireless network 116 are access to a WAN 105 through TCP/IP and other network services such as storage and execution. For example, a laptop computer 107d and PDA 107b are smart terminals. Thin terminals have a relatively low power processing unit and operating system. They are mainly used as peripherals to an application server in a short distance wireless network 116 and their main task is user interaction, rendering output for a user and providing an application server with a user's input. For example, a watch 107a or messaging terminals can be thin terminals.

FIG. 2 illustrates thin terminals. Voice terminal 204 includes a display 204b and a retractable keypad 204a. Messaging Terminal 203 is illustrated in a closed position with a hinge 203a used to open and close terminal 203. Terminal 203 also includes a miniature QWERTY keyboard and display when opened.

In an embodiment of the present invention, device 201 is a cellular modem and includes a clip 202 for a belt.

FIG. 3a illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM")) and Static Random Access Memory ("SRAM") 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transceive and receive short-range radio signals to and from terminals 107, illustrated in FIG. 1, or device 350 illustrated in FIG. 3b.

Cellular, such as GSM, signals are transmitted and received using digital circuit 306, analog circuit 308, transmitter 310, receiver 311 and antenna 312. Digital circuit 306 is coupled to bus 305. In alternate embodiments, device 106 includes a display, a speaker, a microphone, a keypad and a touchscreen, singly or in combination.

FIG. 3b illustrates device 350 that is a hand-held device in an embodiment of the present invention. Device 350, in an embodiment of the present invention, is one of the terminals 107 illustrated in FIG. 1. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals. In alternate embodiments, device 350 includes a display, a speaker, a microphone, a keypad and a touchscreen, singly or in combination. As one of ordinary skill in the art would appreciate, other hardware components would be provided for device 350 in alternate embodiments of the present invention. For example in an embodiment in which device 350 is a laptop computer 107d, a disk drive and other input/output components are present.

III. Software

Figure 4:
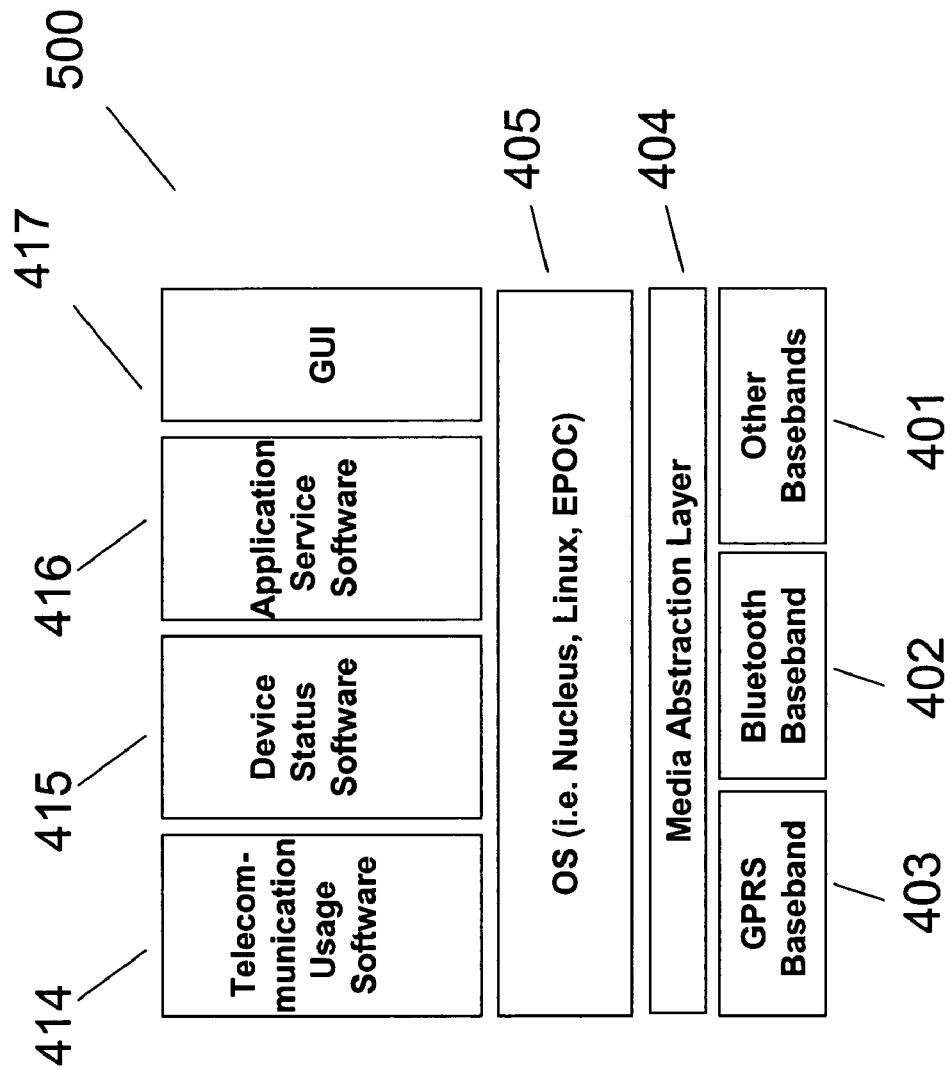
FIG. 4 is a software block diagram architecture for providing a multimedia file used to provide an output signal from a device in a short distance wireless network according to an embodiment of the present invention.

FIG. 4 illustrates a software architecture 400 for device 106 illustrated in FIG. 3a according to an embodiment of the present invention. In an embodiment of the present invention, software 400 is stored in FLASH memory 302 of device 106. In an alternate embodiment of the present invention, software components 414, 415 and 416 are stored in FLASH memory 353 in a terminal of terminals 107. In an embodiment of the present invention, software components referenced in FIG. 4 represent a software program, a software object, a software function, a software subroutine, a software method, a software instance, and a code fragment, singly or in combination. In an alternate embodiment, functions performed by software components illustrated in FIG. 4 are carried out completely or partially by hardware.

In an embodiment of the present invention, software 400, or components of software 400, is stored in an article of manufacture, such as a computer readable medium. For example, software 400 is stored in a magnetic hard disk, an optical disk, a floppy disk, Compact Disk Read-Only Memory ("CD-ROM"), Random Access Memory ("RAM"), Read-Only Memory ("ROM"), or other readable or writeable data storage technologies, singly or in combination. In yet another embodiment, software 400, or components thereof, is downloaded from server 101 illustrated in FIG. 1.

Software 400 includes telecommunication software or physical layer protocol stacks, in particular cellular communications software 403 and short-range radio communications software 402. In an embodiment of the present invention, communication software 403 is a GPRS baseband software component used with processor 306 to transmit and receive cellular signals. In an embodiment of the present invention, communication software 402 is a Bluetooth™ baseband software component used with processor 307 to transmit and receive short-range radio signals. Other telecommunication software may be used as illustrated by other basebands 401.

In an embodiment of the present invention, operating system ("OS") 405 is used to communicate with telecommunications software 402 and 403. In an embodiment of the present invention, operating system 405 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 405 manages hardware and enables execution space for device software components.

Media abstraction layer 404 allows operating system 405 to communicate with basebands 403, 402 and 401, respectively. Media abstraction layer 404 and other abstraction layers translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Software 400 includes a multimedia file 414 and a multimedia file 415 in an embodiment of the present invention. In alternate embodiments of the present invention, more or fewer multimedia files are included in software 400. In an embodiment of the present invention, multimedia files 414 and 415 are thematically related. In an embodiment of the present invention, multimedia files 414 and 415 are downloaded from multimedia file database 606 stored on server 101. In an embodiment of the present invention, application software 416 uses multimedia file 414 to generate an output signal from device 106. For example, application software 416 is a telephony application on a cellular telephone and multimedia file 414 is a ring tone file. In an alternate embodiment of the present invention, multimedia files 414 and 415 are stored on respective terminals 107 that also include respective application software components for generating output signals based on the stored multimedia files 414 and 415.

In an embodiment of the present invention, operating system 405 and Bluetooth™ Baseband software component 402 are used to generate short-range radio signals 110 that include multimedia files to terminals 107 used to generate respective terminal output signals.

In an alternate embodiment of the present invention, a multimedia file 414, application software component 416, operating system 405 and Bluetooth™ Baseband software component 402 are used to generate short-range radio signals 110 that include output signals for terminals 107.

Furthermore, Graphics User Interface ("GUI") 417 is provided to allow a user-friendly interface. In an embodiment of the present invention, multimedia file 414 is a set of fonts used by GUI 417.

Figure 5:
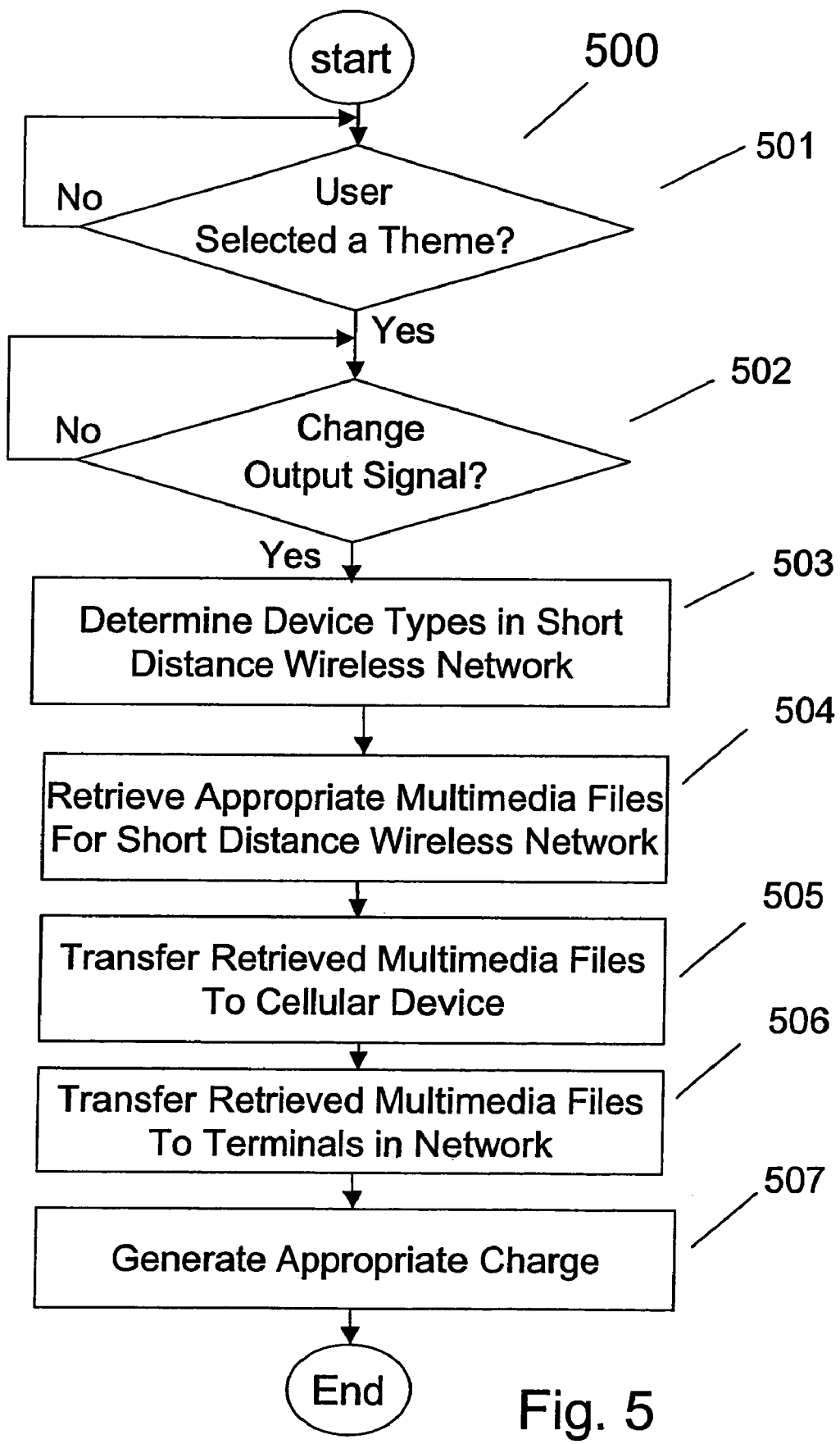
FIG. 5 is a flowchart illustrating providing a multimedia file used to provide an output signal from a device in a short distance wireless network according to an embodiment of the present invention.

FIG. 5 illustrates a method for providing an output signal to a device/terminal in a short distance wireless network 116 according to an embodiment of the present invention. In an embodiment, a method is performed, in part or completely, by software components illustrated in FIGS. 4 and 6. In an embodiment of the present invention, a logic box or step illustrated in FIG. 5 may represent an execution of a software component, such as a software program, a software object, a software function, a software subroutine, a software method, a software instance, a code fragment, singly or in combination. In an alternate embodiment of the present invention, a logic box or step represents execution of a software component, hardware operation or user operation, singly or in combination. In an alternate embodiment of the present invention, fewer or more logic boxes or steps are carried out in the method illustrated in FIG. 5.

FIG. 5 illustrates a method 500 according to an embodiment of the present invention. A determination is made whether a user has selected a theme or specific output signal for a device/terminal in short distance wireless network 116 as illustrated by logic block 501. In an embodiment of the present invention, a user selects a theme 607 in a multimedia file database 606 illustrated in FIG. 6 by selecting a theme name at a web site. In an embodiment of the present invention, the web site is located on server 101. In an alternate embodiment, a user selects a theme or specific output signal from a menu of stored multimedia files on device 106 or terminals 107. If a user has selected a theme or specific output signal, control transitions to logic block 502.

A determination is then made in logic block 502 whether to alter the output signals in short distance wireless network 116. In an embodiment of the present invention, the output signals are altered immediately after a user selection. In an alternate embodiment of the present invention, the output signals are available to be generated at a later time after respective multimedia files are downloaded. Multimedia files may be downloaded during non-peak times in order to efficiently operate WAN 105. In still a further embodiment of the present invention, the output signals are altered periodically responsive to a user's selection stored in user preference field 605b shown in FIG. 6. In an alternate embodiment of the present invention, output signals are changed in response to a promotional event. For example, a determination is made to alter the output signals if a user has selected this promotional event option stored in user preference field 605b and upon the release of the motion picture for viewing. If a determination is made to alter an output signal or output signals in short distance wireless network 116, control transitions to logic block 503.

The types of devices/terminals in short distance wireless network 116 is then determined in logic block 503. The types of devices/terminals in short distance wireless network 116 are determined in order to identify the type of multimedia files to be downloaded to network 116 that is used to generate an output signals. In an embodiment of the present invention, device type software component 601 stored on server 101 queries device 106 in order to determine the types of terminals 107 in short distance wireless network 116. This query may occur immediately before transferring the respective multimedia files or on a periodic basis. In an alternate embodiment of the present invention, device type software component 601 is stored on device 106 that generates a message indicating the type of devices/terminals in short distance wireless network 116 to server 101, and in particular to device types field 605a in user database 604 shown in FIG. 6.

In logic block 504, appropriate multimedia files for short distance wireless network 116 is retrieved from multimedia file database 606 in response to the types of devices/terminals stored in device type field 605a in user database 604. For example, a sound file for watch 107a is retrieved from watch alarm file 607b if a user has selected this particular output signal or respective theme 607.

In logic block 505, appropriate multimedia files are transferred to device 106 from multimedia file database 606 in server 101. In an embodiment of the present invention, file transfer software 602 stored on server 101 transfers the appropriate multimedia files to device 106. In an embodiment of the present invention, the appropriate multimedia files are stored on device 106 and are used to generate output signals from device 106 and at least some of terminals 107.

In an alternate embodiment of the present invention, the multimedia files are downloaded to respective terminals 107 in short distance wireless network 116 and are used to generate respective output signals at respective terminals 107.

In an alternate embodiment of the present invention, a predetermined charge is generated by charge generation software component 603 in response to downloading multimedia files to short distance wireless network 116. The charge may be based upon the number, type and when the multimedia files are downloaded.

IV. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system, comprising:
a first device to provide a first output signal responsive to a first short-range radio signal;
a second device to provide a second output signal responsive to a second short-range radio signal; and
a cellular device to generate a first cellular signal that identifies a first type of device of the first device and a second type of device of the second device, and generate the first and the second short-range radio signals responsive to a second cellular signal, wherein the second cellular signal includes a first multimedia file used to generate the first output signal and a second multimedia file used to generate the second output signal, and wherein a first content of the first multimedia file and a second content of the second multimedia files are thematically related, and wherein the first type of device and second type of device are different,
wherein the first and second multimedia files are downloaded at a predetermined time.

2. The system of claim 1, further comprising:
a cellular network to provide the first and second cellular signals; and,
a processing device, coupled to the cellular network, to store the first multimedia file associated with the first type of device and the second multimedia file associated with the second type of device, wherein the first and second types of devices are stored in a device type field in a user database.

3. The system of claim 2, wherein the first and second multimedia files are downloaded at the predetermined time to the first and second devices respectively in response to a user preference stored in the user database.

4. The system of claim 1, wherein the first output signal is selected from a group consisting of an alarm generated responsive to an event, a ring tone, a background image, a vibration signal, a video, a font type in a graphics user interface, at least a portion of a sound track of a motion picture, at least a portion of a musical work, and at least a portion of an audio/visual work and the second output signal is selected from the group excluding the selection of the first output signal from the group.

5. A method, comprising:
selecting a theme for a short-range radio network having a plurality of devices, wherein the selecting includes a user selecting the theme from a menu;
determining respective device types for the plurality of devices, wherein the determining includes generating a first cellular signal identifying at least one device type of the plurality of devices; and,
outputting a respective plurality of output signals from the respective plurality of devices, wherein the plurality of output signals are related to the theme.

6. The method of claim 5, wherein the selecting includes a user selecting the theme at a website.

7. The method of claim 5, wherein the selecting includes the user selecting the theme from the menu having a plurality of themes, wherein a plurality of multimedia files associated with each theme in the plurality of themes are stored in a processing device coupled to the short-range radio network by a cellular network and downloaded to the plurality of devices by a second cellular signal in response to the selecting.

8. The method of claim 5, wherein the outputting includes transferring a plurality of files include a first multimedia file for a first type of device in the plurality of devices, a second multimedia file for a second type of device in the plurality of devices and a third multimedia file for a third type of device in the plurality of devices, wherein the first type of device, the second type of device and the third type of device are different.

9. The method of claim 5, wherein the determining includes determining respective device types for the plurality of devices, by a processing device coupled to the short-range radio network by a cellular network, and transferring a plurality of respective files to the plurality of respective devices by the processing device and a cellular device in the plurality of devices.

10. The method of claim 9, wherein transferring occurs at a predetermined time in response to a user preference stored in a user database of the processing device.

11. The method of claim 10, wherein the transferring occurs during non-peak times.

12. The method of claim 9, wherein transferring occurs at a predetermined time in response to a user preference stored in a user database of the processing device and a promotional event.

13. A method, comprising;
selecting a theme by a user for a short-range radio network having a plurality of devices;
determining whether to alter the respective output signals of the plurality of devices responsive to the theme;
retrieving respective multimedia files for the plurality of devices;
transferring the respective multimedia files to a cellular device by a second cellular signal; and
outputting a plurality of output signals from the plurality of devices in response to the respective multimedia files.

14. The method of claim 13, further comprising:
charging the user based on the type and number of multimedia files transferred.

15. The method of claim 13, wherein transferring the respective multimedia files occurs at a predetermined time in response to a user preference stored in a user database of a processing device.

16. The method of claim 13, wherein transferring the respective multimedia files occurs at a predetermined time in response to a user preference stored in a user database of a processing device and a promotional event.

17. The method of claim 16, wherein the processing device further includes the respective multimedia files stored with a plurality of multimedia files for different device types associated with a plurality of respective themes, wherein the theme is included in the plurality of themes.

18. The method of claim 13, wherein the promotional event is a release of a motion picture.

19. The method of claim 13, wherein a processing device includes a user database to store the types of devices in the short range radio network and a user preference.

* * * * *